United States Patent
Nagayama

(10) Patent No.: US 8,652,365 B2
(45) Date of Patent: Feb. 18, 2014

(54) MOLD SET AND MANUFACTURING METHOD FOR MANUFACTURING OPTICAL ELEMENT

(75) Inventor: Norimitsu Nagayama, Tokyo (JP)

(73) Assignee: Olympus Corporation, Tokyo (JP)

( * ) Notice: Subject to any disclaimer, the term of this patent is extended or adjusted under 35 U.S.C. 154(b) by 320 days.

(21) Appl. No.: 13/219,202

(22) Filed: Aug. 26, 2011

(65) Prior Publication Data

US 2012/0049395 A1 Mar. 1, 2012

(30) Foreign Application Priority Data

Sep. 1, 2010 (JP) ................................. 2010-195334

(51) Int. Cl.
*B29D 11/00* (2006.01)
*C03B 11/08* (2006.01)

(52) U.S. Cl.
USPC ................. 264/2.2; 65/102; 65/305; 264/2.7; 425/408; 425/808

(58) Field of Classification Search
USPC ......... 264/1.1, 2.2, 2.4, 2.5, 2.7; 65/102, 305; 425/352, 408, 411, 808, 175, 812; 249/134
See application file for complete search history.

(56) References Cited

U.S. PATENT DOCUMENTS

| 5,015,280 A | 5/1991 | Kimoto et al. |
| 6,514,444 B1 * | 2/2003 | Maeda et al. ................. 264/219 |
| 7,147,454 B2 * | 12/2006 | Wang ............................ 425/408 |
| 2006/0038183 A1 * | 2/2006 | Oliver ............................ 257/79 |

FOREIGN PATENT DOCUMENTS

JP 2111635 A 4/1990

* cited by examiner

*Primary Examiner* — Mathieu D. Vargot
(74) *Attorney, Agent, or Firm* — Dickstein Shapiro LLP

(57) ABSTRACT

A mold set includes: a first mold and a second mold placed so that they sandwich an optical material and face each other; and a first spacer and a second spacer provided between the first and second molds, wherein: the first spacer secures an interval between the first and second molds at a first temperature achieved in a process of pressurizing the optical material; the first spacer shrinks in a mold opening-closing direction more greatly than the second spacer while the first temperature is changing to a second temperature achieved in a process of cooling the optical material; and the second spacer secures the interval between the first and second molds at the second temperature.

8 Claims, 17 Drawing Sheets

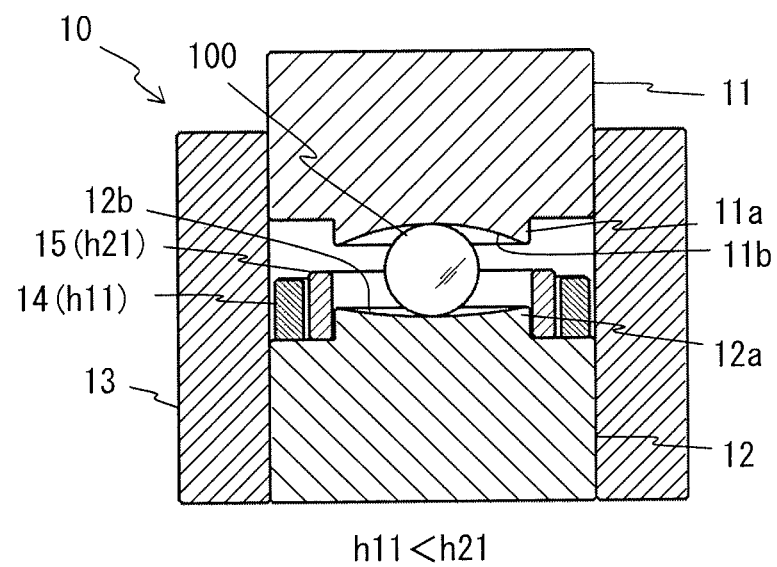
F I G. 1 A

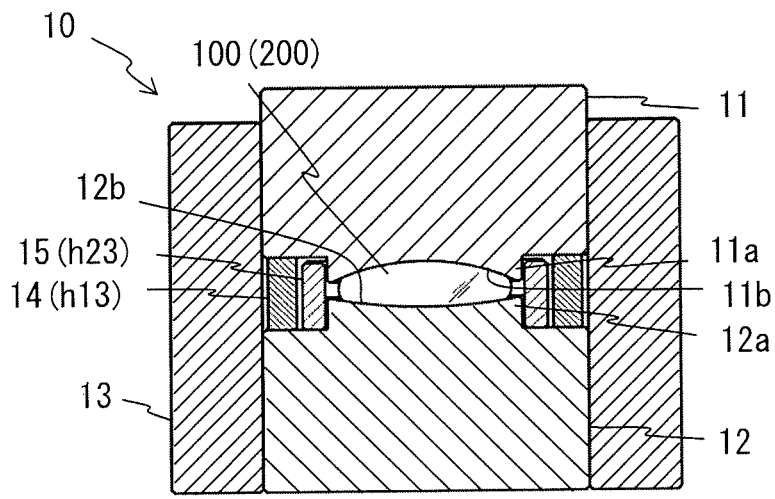
h13>h23
(FIRST TEMPERATURE T1 ACHIEVED IN
THE PROCESS OF PRESSURIZATION)
F I G. 1 C

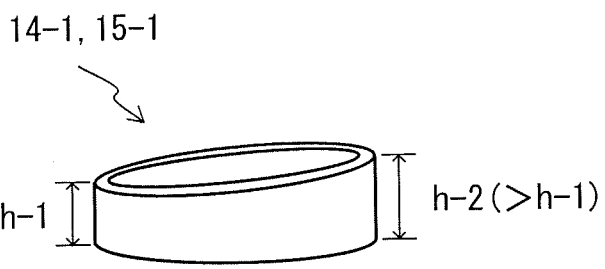
F I G. 4

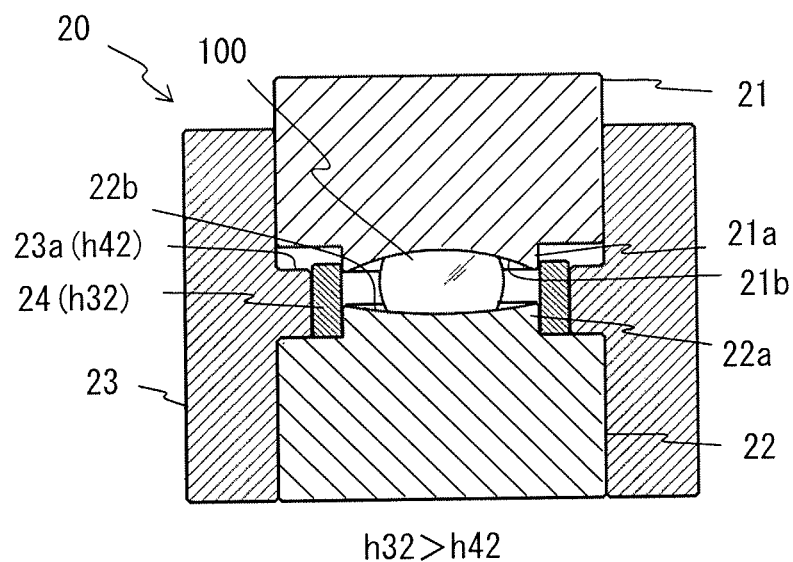
F I G. 5 B

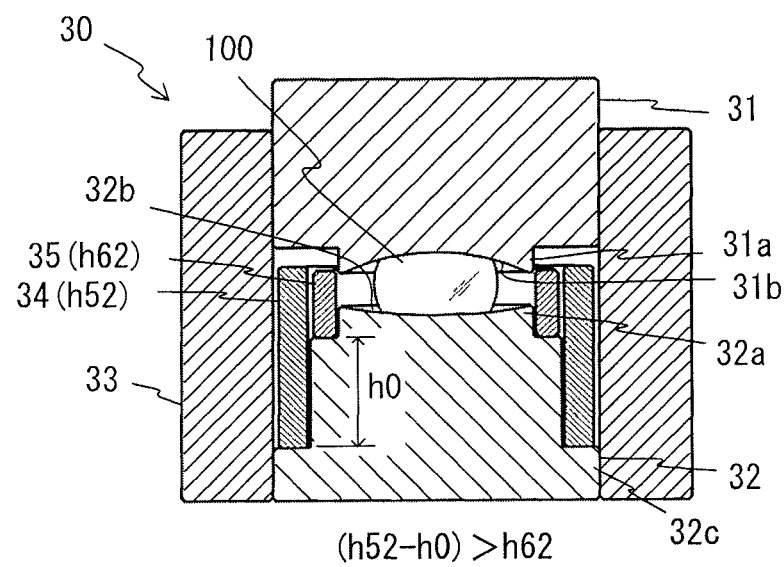
F I G. 6 B

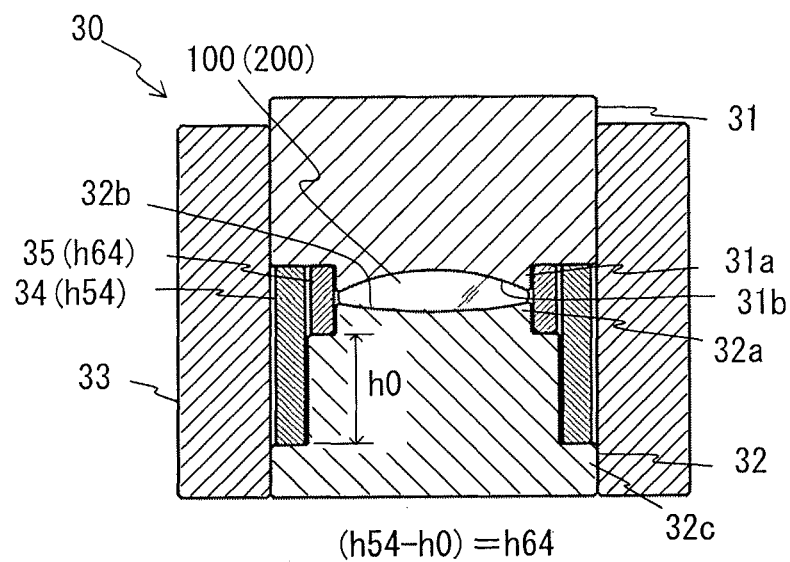
F I G. 6 D

MOLD SET AND MANUFACTURING METHOD FOR MANUFACTURING OPTICAL ELEMENT

CROSS REFERENCE TO RELATED APPLICATIONS

This application is based upon and claims the benefit of priority from prior Japanese Patent Application No. 2010-195334, filed Sep. 1, 2010, the entire contents of which are incorporated herein by reference.

BACKGROUND OF THE INVENTION

1. Field of the Invention

The present invention relates to a mold set used for manufacturing an optical element, such as a lens, prism, or mirror, and to a manufacturing method for manufacturing an optical element.

2. Description of the Related Art

Conventionally, press molding has been performed in which apiece of glass which has been heated and softened is pressurized. When press molding is applied to a piece of glass, a molding set provided with a pair of molds and a sleeve which guides the pair of molds is used (see, for example, patent document 1).

In press molding, a piece of glass is heated to a glass-transition temperature or higher so as to be heated and softened, and it is pressurized and transformed by a mold and cooled down to the glass-transition temperature or lower so that it hardens and shrinks. A glass mold-object is then released from the mold and taken out as an optical element.

Patent Document 1: Japanese Laid-open Patent Publication No. H02-111635

SUMMARY OF THE INVENTION

A mold set according to the present invention includes: a first mold and a second mold placed so that they sandwich an optical material and face each other; and a first spacer and a second spacer provided between the first and second molds, wherein: the first spacer secures an interval between the first and second molds at a first temperature achieved in the process of pressurizing the optical material; the first spacer shrinks in a mold opening-closing direction more greatly than the second spacer while the first temperature is changing to a second temperature achieved in the process of cooling the optical material; and the second spacer secures the interval between the first and second molds at the second temperature.

In the mold set, the shrinkage amount of the first spacer in the mold opening-closing direction achieved while the first temperature is changing to the second temperature may be larger than the shrinkage amount of the optical material in the mold opening-closing direction achieved while the first temperature is changing to the second temperature, and the shrinkage amount of the second spacer in the mold opening-closing direction achieved while the first temperature is changing to the second temperature may be smaller than the shrinkage amount of the optical material in the mold opening-closing direction achieved while the first temperature is changing to the second temperature.

In the mold set, the first spacer may have a higher linear expansion coefficient than the second spacer.

In the mold set, the thickness of the first spacer in the mold opening-closing direction at the first and second temperatures may be greater than the thickness of the second spacer in the mold opening-closing direction at the first and second temperatures.

In the mold set, the thickness of the first spacer in the mold opening-closing direction at the first and second temperatures may be at least two times greater than the thickness of the second spacer in the mold opening-closing direction at the first and second temperatures.

The mold set may be further provided with a sleeve placed at the circumference of the first and second molds and holding the first and second molds, and the second spacer may be provided integral with the sleeve.

In the mold set, the first spacer between the first and second molds may be placed further outward than the second spacer.

The manufacturing method for manufacturing an optical element according to the present invention includes: heating and softening an optical material between the first and second molds which face each other; pressurizing and transforming the optical material after the heating and softening; and cooling the optical material after the pressurizing and transforming, wherein: at a first temperature achieved during the pressurizing and transforming, a first spacer secures the interval between the first and second molds; and, at a second temperature achieved during the cooling, a second spacer secures the interval between the first and second molds, wherein the shrinkage amount of the second spacer in the mold opening-closing direction achieved while the first temperature is changing to the second temperature is smaller than the shrinkage amount of the shrinking of the first spacer in the mold opening-closing direction achieved while the first temperature is changing to the second temperature.

BRIEF DESCRIPTION OF THE DRAWINGS

FIG. 1A is a cross sectional view showing a mold set according to a first embodiment of the present invention (Pattern 1).

FIG. 1C is a cross sectional view showing the mold set according to the first embodiment of the present invention (Pattern 3).

FIG. 4 is a perspective view showing a high expansion ring and a low expansion ring of a mold set according to a variation of the first embodiment of the present invention.

FIG. 5B is a cross sectional view showing the mold set according to the second embodiment of the present invention (Pattern 2).

FIG. 6B is a cross sectional view showing the mold set according to the third embodiment of the present invention (Pattern 2).

FIG. 6D is a cross sectional view showing the mold set according to the third embodiment of the present invention (Pattern 4).

DESCRIPTION OF THE PREFERRED EMBODIMENT

Figure 1B:
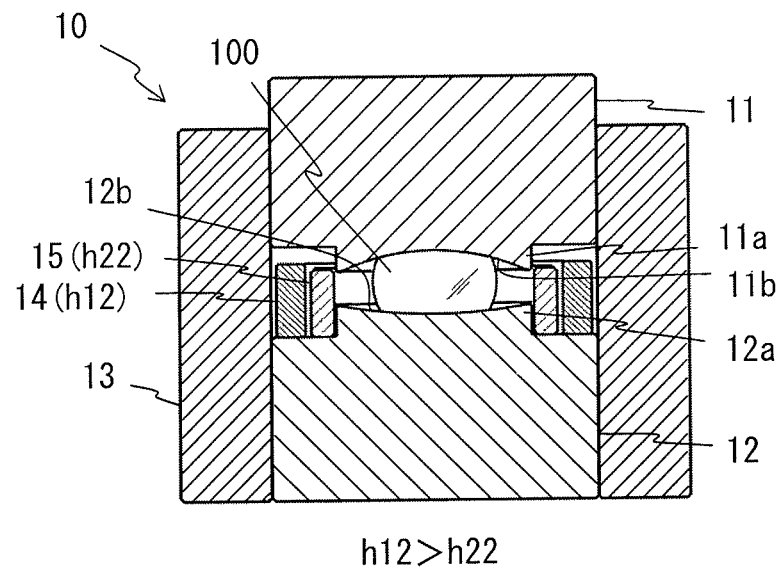
FIG. 1B is a cross sectional view showing the mold set according to the first embodiment of the present invention (Pattern 2).
Figure 1D:
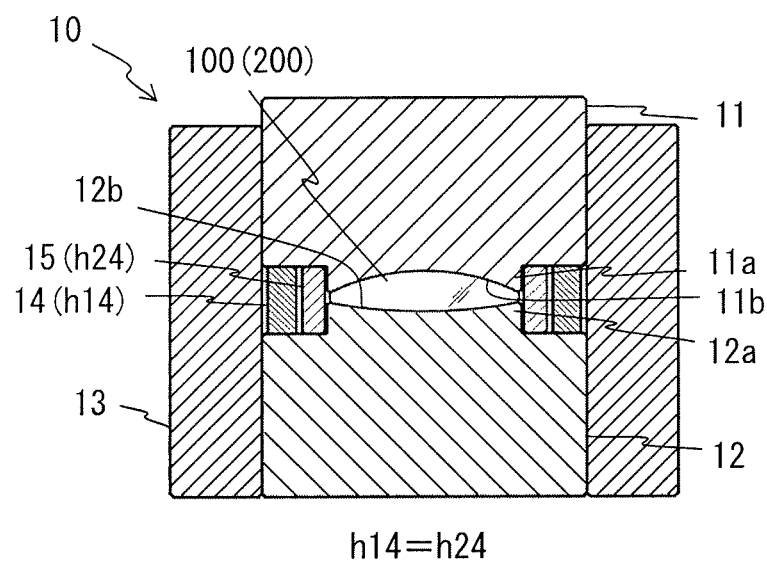
FIG. 1D is a cross sectional view showing the mold set according to the first embodiment of the present invention (Pattern 4).

In press molding, after an optical material such as glass is pressurized, a shearing force is generated due to friction against the surface of the mold which occurs while the optical material hardens and shrinks; accordingly, the optical material does not shrink smoothly, and ultimately the optical material is not smoothly released from the mold.

In the following, mold sets and manufacturing methods for manufacturing an optical element according to embodiments of the present invention will be described with reference to the drawings.

First Embodiment

FIGS. 1A-1E are each a cross sectional view showing a mold set 10 according to a first embodiment of the present invention.

As shown in FIG. 1A, the mold set 10 includes: an upper mold 11, which is an example of a first mold; a lower mold 12, which is an example of a second mold; a sleeve 13; a high expansion ring 14; and a low expansion ring 15. The high expansion ring 14 is an example of a first spacer provided between the upper mold 11 and the lower mold 12. The low expansion ring 15 is an example of a second spacer provided between the upper mold 11 and the lower mold 12.

The upper mold 11 and the lower mold 12 are placed so that they face each other and sandwich an optical material 100, which is, for example, glass.

The upper mold 11 has a column shape and a small diameter part 11a is formed at the lower end of this shape. The lower mold 12 has a column shape and a small diameter part 12a is formed at the upper end of this shape.

Concave mold surfaces 11b and 12b for impressing a double-convex shape on the optical material 100 are formed on the opposing end surfaces of the small diameter part 11a of the upper mold 11 and the small diameter part 12a of the lower mold 12.

The sleeve 13 has a tubular shape, and it is placed at the circumference of the upper mold 11 and the lower mold 12 and holds the upper mold 11 and the lower mold 12.

The upper mold 11, the lower mold 12, and the sleeve 13 are fixed to a manufacturing apparatus (not shown) for manufacturing an optical element. The upper mold 11 is caused to ascend and descend by pressurization means (not shown), such as an air cylinder, and it is inserted into and pulled from the sleeve 13.

The high expansion ring 14 and the low expansion ring 15 are placed on the upper part of the lower mold 12 in such a way that they surround the small diameter part 12a of the lower mold 12, and they secure a predetermined length of the interval between the upper mold 11 and the lower mold 12. The high expansion ring 14 is placed outside the low expansion ring 15.

The high expansion ring 14 has a higher linear expansion coefficient than the low expansion ring 15. As an example, the high expansion ring 14 is stainless steel which has a linear expansion coefficient of $170 \times 10^{-7}$ [1/K], and the low expansion ring 15 is crystallized glass which has a linear expansion coefficient of $30 \times 10^{-7}$ [1/K].

The high expansion ring 14 has a higher linear expansion coefficient than the optical material 100, and the low expansion ring 15 has a lower linear expansion coefficient than the optical material 100. As an example, the optical material 100 is glass having a linear expansion coefficient of $90 \times 10^{-7}$ [1/K]. In order to smoothly achieve mold release, which will be described hereafter, it is desirable that the linear expansion coefficient of the low expansion ring 15 be lower than that of the optical material 100 by the range of $10 \times 10^{-7}$ [1/K] to $40 \times 10^{-7}$ [1/K].

The upper mold 11, the lower mold 12, and the sleeve 13 are, for example, cemented carbide having a linear expansion coefficient of $50 \times 10^{-7}$ [1/K]. The aforementioned linear expansion coefficients are exemplary linear expansion coefficients used at a temperature ranging from 450 [C] to 600 [C], and hence they may be changed appropriately.

In the following, a workflow for manufacturing an optical element 200 from the optical material 100 will be described; however, the points already described above are omitted as appropriate. An exemplary situation will be described in which the upper mold 11, the lower mold 12, and the sleeve 13 are fixed to a manufacturing apparatus for manufacturing an optical element, and the optical material 100 is heated, pressurized, and cooled at the same position. However, the mold set 10 may be transferred to one or more heating stages, one or more pressurization stages, and one or more cooling stages in this order, wherein the heating stages, the pressurization stages, and the cooling stages may be placed in the manufacturing apparatus for manufacturing an optical element.

First, while the upper mold 11 is in an upper waiting position, the optical material 100, which has, for example, a spherical shape, is placed on the concave mold surface 12b of the lower mold 12 by a transportation robot (not shown). Then, as shown in FIG. 1A, the upper mold 11 is caused to descend by pressurization means (not shown) and inserted into the sleeve 13 from above so as to abut the optical material 100. At this moment (i.e., before the heating step), a thickness h11 of the high expansion ring 14 in the mold opening-closing direction (i.e., the vertical direction in FIG. 1A) is less than a thickness h21 of the low expansion ring 15.

The optical material 100, placed between the upper mold 11 and the lower mold 12, is heated and softened via heat provided by heating means (not shown) such as a heater producing heat being conducted via the upper mold 11, the lower mold 12, the sleeve 13, and the like (the heating step).

As shown in FIG. 1B, the thickness h11 of the high expansion ring 14 becomes greater than a thickness h22 of the low expansion ring 15 via the optical material 100 being heated, after the pressurization step of pressurizing and transforming the optical material 100 via the upper mold 11 descending is started (thickness h12).

Accordingly, as shown in FIG. 1C, during the pressurizing step (a first temperature T1), only the high expansion ring 14 (thickness h13) from among the high expansion ring 14 and the low expansion ring 15 (thickness h23) is in contact with the upper mold 11 so that it secures (determines) an interval between the upper mold 11 and the lower mold 12. In order for this interval to be placed at an intended pressurization position, the thickness of the high expansion ring 14 is defined in accordance with the relationship with a linear expansion coefficient. During the pressurization step, the optical material 100 is heated to, for example, a temperature that is higher than a glass transition temperature by about 30 degrees C. The first temperature T1 is at least one of the temperatures achieved during the pressurization step.

Next, the pressurized and transformed optical material 100 (i.e., the optical element 200 obtained via molding) is cooled down to, for example, a grass transition temperature or lower via, for example, the temperature of the heating means being lowered (the cooling step), with the result that the optical material 100 hardens and shrinks. The high expansion ring 14 has a higher linear expansion coefficient than the low expansion ring 15, and hence, after the cooling step is started, it will shrink in the mold opening-closing direction more greatly than the low expansion ring 15 and will have the same thickness as the low expansion ring 15 (thicknesses h14 and h24 shown in FIG. 1D).

During the cooling step, the upper mold 11 is also pressurized downward by pressurization means (not shown). When the high expansion ring 14 is thicker than the low expansion ring 15, the upper mold 11 descends in accordance with shrinking of the high expansion ring 14. At this moment, the optical material 100 (the optical element 200), which has a lower linear expansion coefficient than the high expansion ring 14, is pressurized as much as or more than the shrinkage amount.

The high expansion ring 14 has a higher linear expansion coefficient than the low expansion ring 15; accordingly, after the thickness of the high expansion ring 14 and that of the low expansion ring 15 become identical with each other, the high expansion ring 14 becomes thinner than the low expansion ring 15 at a second temperature T2 achieved during the cooling step. The second temperature T2 is at least one of the temperatures achieved during the cooling step.

Figure 1E:
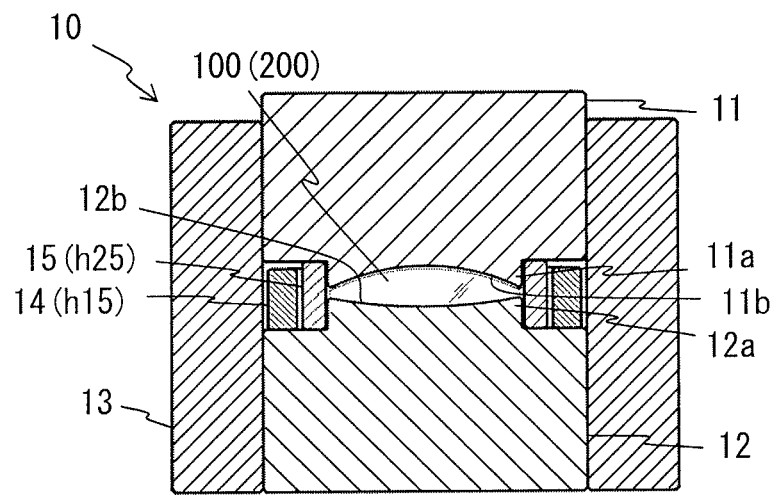
FIG. 1E is a cross sectional view showing the mold set according to the first embodiment of the present invention (Pattern 5).

The low expansion ring 15 has a lower linear expansion coefficient and a smaller shrinkage amount than the optical material 100 (the optical element 200), and hence the upper mold 11 is in contact with the low expansion ring 15 as shown in FIG. 1E. In this way, the low expansion ring 15 secures (determines) the interval between the upper mold 11 and the lower mold 12 at the second temperature achieved during the cooling step. Because of the low expansion ring 15, the upper mold 11 does not follow the hardening and shrinking of the optical material 100 (the optical element 200) even when it is pulled by the optical material 100 (the optical element 200). Accordingly, a gap appears between the upper mold 11 and the optical material 100 (the optical element 200), and hence the optical material 100 (the optical element 200) is released from the upper mold 11.

In the present embodiment, the shrinkage amount of the optical material 100 that is achieved while the first temperature T1 is changing into the second temperature T2 is larger than the shrinkage amount of the low expansion ring 15 that is achieved while the first temperature T1 is changing into the second temperature T2. The temperatures of the high expansion ring 14, the low expansion ring 15, and the optical material 100 (the optical element 200) become the first temperature T1 or the second temperature T2 at different timings.

Figure 3:
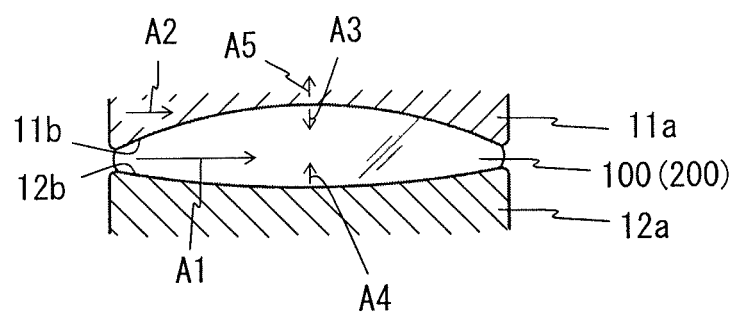
FIG. 3 is a cross sectional view illustrating hardening and shrinking of an optical element in the mold set according to the first embodiment of the present invention.

During the aforementioned mold release, as shown in FIG. 3, a force is generated by the difference between the shrinkage amount of the optical material 100 (the optical element 200) in the direction orthogonal to the mold opening-closing direction (arrow A1) and the shrinkage amount of the upper mold 11 in this direction (arrow A2). In addition to this force, other forces are generated by the shrinking of the optical material 100 (the optical element 200) in the mold opening-closing direction (arrows A3 and A4) and yet another force is generated by the shrinking of the upper mold 11 in the mold opening-closing direction (arrow A5).

Accordingly, the optical material 100 (the optical element 200) is released from the mold smoothly. After this, the upper mold 11 moves to the upper waiting position, and a transportation robot (not shown) takes out the optical element on the concave mold surface 12b of the lower mold 12.

Figure 2:
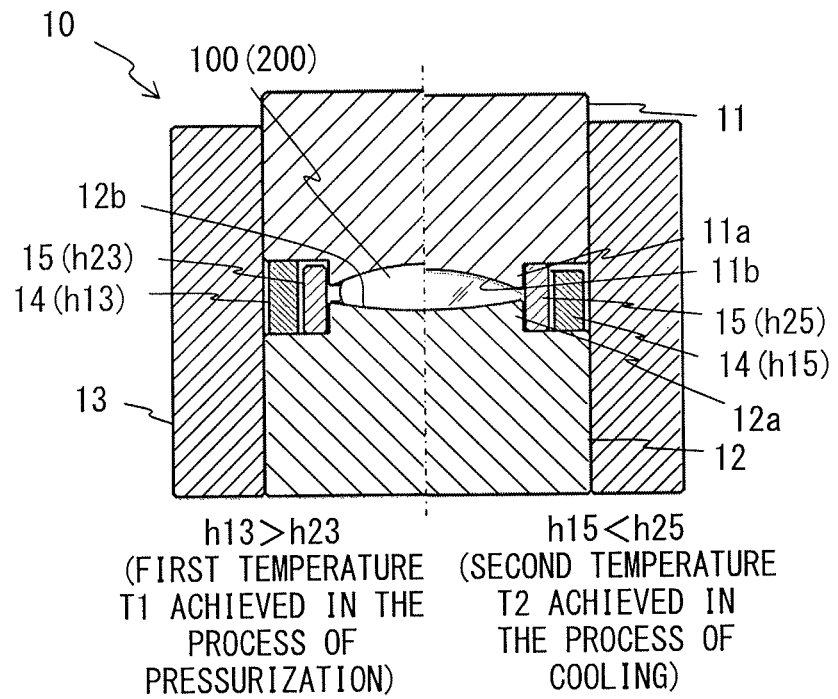
FIG. 2 is a cross sectional view comparing and illustrating states of the mold set according to the first embodiment of the present invention, one of the states being achieved while the mold set is being pressurized and the other of the states being achieved while the mold set is being cooled.

In the present embodiment described above, as shown in FIG. 1C (FIG. 2), the high expansion ring (the first spacer) 14 secures the interval between the upper mold (the first mold) 11 and the lower mold (the second mold) 12 at the first temperature T1 achieved while the optical material 10 is being pressurized. The high expansion ring 14 shrinks in the mold opening-closing direction more greatly than the low expansion ring (the second spacer) 15 while the first temperature T1 is changing into the second temperature T2 achieved while the optical material 100 is being cooled. As shown in FIG. 1E (FIG. 2), the low expansion ring 15 secures the interval between the upper mold 11 and the lower mold 12 at the second temperature T2.

Accordingly, without the position of the upper mold 11 being complexly controlled by pressurization means or the like, the high expansion ring 14 adjusts the pressurization position of the optical material 100 (the optical element 200) at which it is pressurized at the first temperature T1 achieved while the optical material 100 is pressurized. After this, the upper mold 11 descends in accordance with the shrinking of the high expansion ring 14. The low expansion ring 15 prevents the upper mold 11 from following the shrinking of the high expansion ring 14, thereby adjusting, at the second temperature T2, the mold release position of the optical material 100 (the optical element 200) at which it is released from the mold.

Accordingly, according to the present embodiment, the optical element 200 may be released smoothly from the mold by using a simple configuration. In addition, using a simple configuration, the thickness of the optical element 200 and the mold release timing may be adjusted.

In the present embodiment, the shrinkage amount of the high expansion ring 14 in the mold opening-closing direction that is achieved while the first temperature T1 (FIG. 1C) is changing into the second temperature T2 (FIG. 1E) is larger than the shrinkage amount of the optical material 100 in the mold opening-closing direction that is achieved while the first temperature T1 (FIG. 1C) is changing into the second temperature T2 (FIG. 1E). The shrinkage amount of the low expansion ring 15 in the mold opening-closing direction that is achieved while the first temperature T1 is changing into the second temperature T2 is smaller than the shrinkage amount of the optical material 100 in the mold opening-closing direction that is achieved while the first temperature T1 is changing into the second temperature T2.

In other words, the shrinkage amount of the high expansion ring 14 that is achieved while the first temperature T1 is changing into the second temperature T2 is larger than the shrinkage amount of the optical material 100 that is achieved while the first temperature T1 is changing into the second temperature T2, and hence the upper mold 11 may be caused to descend as much as or more than the shrinking of the optical material 100 (the optical element 200). After this, since the shrinkage amount of the low expansion ring 15 is smaller than that of the optical material 100, the upper mold 11 does not follow the hardening and shrinking of the optical material 100 (the optical element 200) even when it is pulled by the optical material 100 (the optical element 200). Accordingly, a gap appears between the upper mold 11 and the optical material 100 (the optical element 200), and hence the optical material 100 (the optical element 200) is released from the upper mold 11. Accordingly, the optical element 200 may be released from the mold smoothly.

In the present embodiment, the high expansion ring 14 has a higher linear expansion coefficient than the low expansion ring 15. Accordingly, using a simple configuration in which the high expansion ring 14 is essentially as thick as the low expansion ring 15, the shrinkage amount of the high expansion ring 14 in the mold opening-closing direction achieved while the first temperature is changing to the second temperature may be larger than the shrinkage amount of the low expansion ring 15 in the mold opening-closing direction achieved while the first temperature is changing to the second temperature.

In the present embodiment, the high expansion ring 14 between the upper mold 11 and the lower mold 12 is placed outside the low expansion ring 15. Accordingly, the high expansion ring 14, placed at the outside, which is cooler than the inside, is cooled more effectively while the first temperature T1 is changing into the second temperature T2, and hence it shrinks more smoothly. As a result, the optical element 200 may be released from the mold even more smoothly.

In regard to the present embodiment, situations have been described in which the optical element 200 (the optical material 100) is a double-convex lens; however, the optical material 200 may be a double-concave lens, a single-convex lens, or the like. In addition, the optical material 200 may be an optical material for another application such as a prism or mirror. The application of the optical material 200 is not particularly limited.

In regard to the present embodiment, exemplary situations have been described in which the first spacer is the high expansion ring 14 and the second spacer is the low expansion ring 15; however, the first and second spacers do not necessarily need to have a ring shape (a tubular shape), and anything can be used as the first and second spacers as long as it is capable of securing the interval between the upper mold 11 and the lower mold 12.

In addition, when the first and second spacers are respectively a high expansion ring 14-1 and a low expansion ring 15-1 each of which has a tubular shape (a ring shape), each of their thicknesses does not need to remain the same around the circumference. As an example, as shown in FIG. 4, the thicknesses of the high expansion ring 14-1 and the low expansion ring 15-1 may each vary around the circumference (thickness h-1<h-2). In this case, the upper mold 11 tilts by contacting only a portion having the greatest thickness (thickness h-2) of the high expansion ring 14-1 and of the low expansion ring 15-1, and hence the optical material 100 (the optical element) may be smoothly released from the upper mold 11. By making the variation in the thickness of the second spacer around the circumference to be greater than the variation in the thickness of the first spacer around the circumference, the upper mold 11 may tilt more certainly while an attempt is made to release the optical material from the mold.

Second Embodiment

FIGS. 5A-5E are each a cross sectional view showing a mold set 20 according to a second embodiment of the present invention.

The present embodiment is different from the first embodiment described above in that it is a configuration using, as the second spacer, a low expansion convex part 23a integral with a sleeve 23 instead of using the low expansion ring 14 in the first embodiment and in that it has another configuration associated with this configuration using the low expansion convex part 23a. In points other than these configurations, the second embodiment is generally similar to the first embodiment. Accordingly, descriptions of similar points will be omitted as appropriate.

Figure 5A:
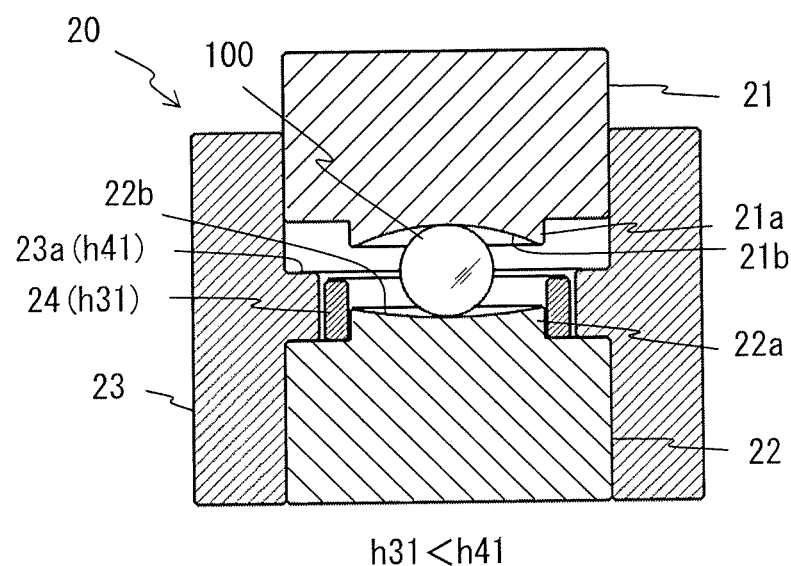
FIG. 5A is a cross sectional view showing a mold set according to a second embodiment of the present invention (Pattern 1).

As shown in FIG. 5A, the mold set 20 includes: an upper mold 21, which serves as a first mold; a lower mold 22, which serves as a second mold; a sleeve 23; and a high expansion ring 24, which serves as a first spacer.

The sleeve 23 has a tubular shape, and it is placed at the circumference of the upper mold 21 and the lower mold 22 and holds the upper mold 21 and the lower mold 22. In the sleeve 23, the low expansion convex part 23a which secures the interval between the upper mold 21 and the lower mold 22 is provided in such a way that it projects in the circumferential direction inside the sleeve 23.

The high expansion ring 24 is placed on the upper part of the lower mold 22 in such a way that it surrounds the small diameter part 22a of the lower mold 22, and it secures the interval between the upper mold 21 and the lower mold 22, as with the low expansion convex part 23a. The high expansion ring 24 is placed inside the low expansion convex part 23a.

The high expansion ring 24 has a higher linear expansion coefficient than the low expansion convex part 23a. As an example, the high expansion ring 24 is stainless steel having a linear expansion coefficient of $170 \times 10^{-7}$ [1/K], and, as with the upper mold 21 and the lower mold 22 and other portions of the sleeve 23, the low expansion convex part 23a is a cemented carbide having a linear expansion coefficient of $50 \times 10^{-7}$ [1/K].

The high expansion ring 24 has a higher linear expansion coefficient than the optical material 100, and the low expansion convex part 23a has a lower linear expansion coefficient than the optical material 100. As an example, the optical material 100 is glass having a linear expansion coefficient of $90 \times 10^{-7}$ [1/K]. The aforementioned linear expansion coefficients are exemplary linear expansion coefficients used at a temperature of 450 [C] to 600 [C], and hence they may be changed appropriately.

In the following, a workflow for manufacturing an optical element 200 from the optical material 100 will be described; however, the points already described regarding the first embodiment and the points already described regarding the aforementioned configuration are omitted as appropriate.

First, while the upper mold 21 is in an upper waiting position, the optical material 100, which has, for example, a spherical shape, is placed on the concave mold surface 22b of the lower mold 22 by a transportation robot (not shown). Then, as shown in FIG. 5A, the upper mold 21 is caused to descend by pressurization means (not shown) and inserted into the sleeve 23 from above so as to abut the optical material 100. At this moment (i.e., before the heating step), a thickness h31 of the high expansion ring 24 in the mold opening-closing direction is less than a thickness h41 of the low expansion convex part 23a.

The optical material 100, placed between the upper mold 21 and the lower mold 22, is heated and softened via heat provided by heating means (not shown) such as a heater producing heat being conducted via the upper mold 21, the lower mold 22, the sleeve 23, and the like (the heating step).

As shown in FIG. 5B, the thickness h31 of the high expansion ring 24 becomes greater than a thickness h42 of the low expansion convex part 23a via the optical material 100 being heated, after the pressurization step of pressurizing and transforming the optical material 100 via the upper mold 21 descending is started (thickness h32).

Accordingly, although not shown in the drawing, during the pressurizing step (a first temperature T1), only the high expansion ring 24 (thickness h33) from among the high expansion ring 24 and the low expansion convex part 23a (thickness h43) is in contact with the upper mold 11 so that it secures an interval between the upper mold 11 and the lower mold 12.

Next, the pressurized and transformed optical material 100 (i.e., the optical element 200 obtained via molding) is cooled down to, for example, a glass transition temperature or lower via, for example, the temperature of the heating means being lowered (the cooling step), with the result that the optical material 100 hardens and shrinks. The high expansion ring 24 has a higher linear expansion coefficient than the low expansion convex part 23a, and hence, after the cooling step is started, it will shrink in the mold opening-closing direction more greatly than the low expansion convex part 23a and will have the same thickness as the low expansion convex part 23a.

During the cooling step, the upper mold 21 is also pressurized downward by pressurization means (not shown). When the high expansion ring 24 is thicker than the low expansion convex part 23a, the upper mold 21 descends in accordance with shrinking of the high expansion ring 24. At this moment, the optical material 100 (the optical element 200), which has a lower linear expansion coefficient than the high expansion ring 24, is pressurized as much as or more than the shrinkage amount.

The high expansion ring 24 has a higher linear expansion coefficient than the low expansion convex part 23a; accordingly, after the thickness of the high expansion ring 24 and that of the low expansion convex part 23a become identical with each other, the high expansion ring 24 becomes thinner than the low expansion ring 25 at a second temperature T2 achieved during the cooling step.

Figure 5C:
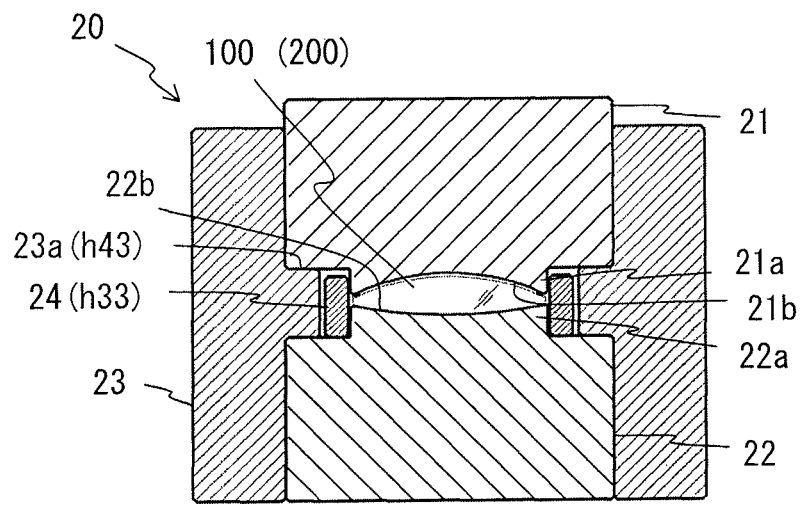
FIG. 5C is a cross sectional view showing the mold set according to the second embodiment of the present invention (Pattern 3).

The low expansion convex part 23a has a lower linear expansion coefficient than the optical material 100 (the optical element 200), and hence the upper mold 21 is in contact with the low expansion convex part 23a as shown in FIG. 5C. In this way, the low expansion convex part 23a secures the interval between the upper mold 21 and the lower mold 22 at the second temperature T2 achieved during the cooling step. Because of the low expansion convex part 23a, the upper mold 21 does not follow the hardening and shrinking of the optical material 100 (the optical element 200) even when it is pulled by the optical material 100 (the optical element 200). Accordingly, a gap appears between the upper mold 21 and the optical material 100 (the optical element 200), and hence the optical material 100 (the optical element 200) is released from the upper mold 21.

In this way, the optical material 100 (the optical element 200) is released from the mold smoothly. After this, the upper mold 21 moves to the upper waiting position, and a transportation robot (not shown) takes out the optical element on the concave mold surface 22b of the lower mold 22.

In the present embodiment described above, the high expansion ring (the first spacer) 24 secures the interval between the upper mold (the first mold) 21 and the lower mold (the second mold) 22 at the first temperature T1 achieved while the optical material 100 is pressurized. The high expansion ring 24 shrinks in the mold opening-closing direction more greatly than the low expansion convex part (the second spacer) 23a while the first temperature T1 is changing into the second temperature T2 achieved while the optical material 100 is cooled. As shown in FIG. 5C, the low expansion convex part 23a secures the interval between the upper mold 21 and the lower mold 22 at the second temperature T2.

Accordingly, without the position of the upper mold 21 being complexly controlled by pressurization means or the like, the high expansion ring 24 adjusts the pressurization position of the optical material 100 (the optical element 200) at which it is pressurized, at the first temperature T1 achieved while the optical material 100 is pressurized. After this, the upper mold 21 descends in accordance with the shrinking of the high expansion ring 24. The low expansion convex part 23a prevents the upper mold 21 from following the shrinking of the high expansion ring 24, thereby adjusting the mold release position of the optical material 100 (the optical element 200) at which it is released from the mold.

Accordingly, according to the present embodiment, the optical element 200 may be released smoothly from the mold by using a simple configuration. In addition, using a simple configuration, the thickness of the optical element 200 and the mold release timing may be adjusted.

In the present embodiment, the low expansion convex part 23a which serves as the second spacer is provided integrally with the sleeve 23. Accordingly, using a still simpler configuration, the optical element 200 may be released smoothly from the mold.

Third Embodiment

FIGS. 6A-6E are each a cross sectional view showing a mold set 30 according to a third embodiment of the present invention.

The present embodiment is different from the first embodiment described above in that it is a configuration in which the thickness of the high expansion ring 34 in the mold opening-closing direction at the first temperature T1 and the second temperature T2 is greater than the thickness of the low expansion ring 35 in the mold opening-closing direction at the first temperature T1 and the second temperature T2 and in that it has another configuration associated with this configuration. In points other than these configurations, the third embodiment is generally similar to the first embodiment. Accordingly, descriptions of similar points will be omitted as appropriate.

Figure 6A:
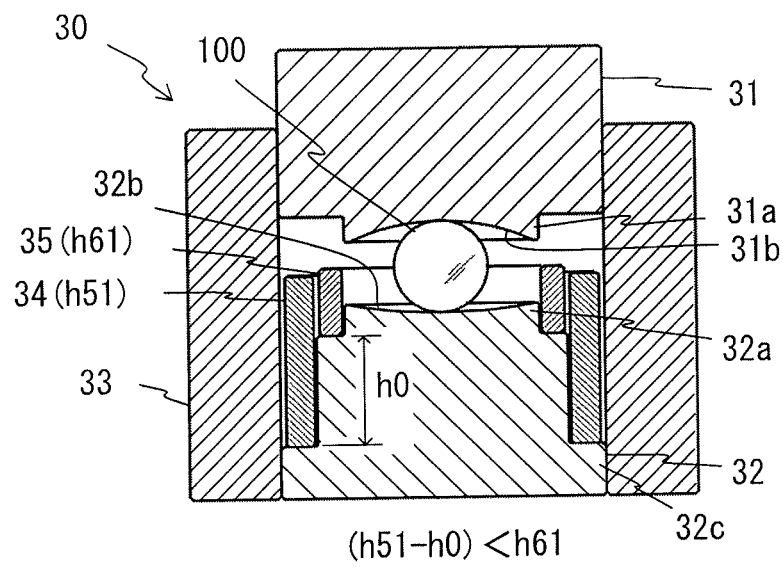
FIG. 6A is a cross sectional view showing a mold set according to a third embodiment of the present invention (Pattern 1).

As shown in FIG. 6A, the mold set 30 includes: an upper mold 31, which serves as a first mold; a lower mold 32, which serves as a second mold; a sleeve 33; a high expansion ring 34, which serves as a first spacer; and a low expansion ring 35, which serves as a second spacer.

The upper mold 31 and the lower mold 32 face each other and sandwich an optical material 100 which is, for example, glass.

The upper mold 31 has a column shape, and a small diameter part 31a is formed at the lower end of this shape.

The lower mold 32 has a column shape, and a small diameter part 32a is formed at the upper end of this shape and a large diameter part 32c is formed at the lower end of this shape.

Concave mold surfaces 31b and 32b for impressing a double-convex shape on the optical material 100 are formed on opposing end surfaces of the small diameter part 31a of the upper mold 31 and the small diameter part 32a of the lower mold 32.

The low expansion ring 35 is placed around the small diameter part 32a in such a way that it surrounds the small diameter part 32a. Meanwhile, the high expansion ring 34 is placed at the upper part of the large diameter part 32c.

The thickness between the small diameter part 32a and the large diameter part 32c is h0, and the lower end of the high expansion ring 34 is located lower than the lower end of the low expansion ring 35 by a thickness h0. The value of the thickness h0 varies in accordance with a temperature change made in the manufacturing process of the optical element 200; however, let the value be a fixed value for the purposes of illustration.

The high expansion ring 34 may be formed of, for example, the same material as the low expansion ring 35, and it is, for example, crystallized glass having a linear expansion coefficient of $30 \times 10^{-7}$ [1/K].

The high expansion ring 34 and the low expansion ring 35 each have a lower linear expansion coefficient than the optical material 100. As an example, the optical material 100 is glass having a linear expansion coefficient of $90 \times 10^{-7}$ [1/K]. The upper mold 31, the lower mold 32, and the sleeve 33 are, for example, cemented carbide having a linear expansion coefficient of $50 \times 10^{-7}$ [1/K].

In the following, a workflow for manufacturing an optical element 200 from the optical material 100 will be described; however, the points already described regarding the first embodiment and the points already described regarding the aforementioned configuration are omitted as appropriate.

First, while the upper mold 31 is in an upper waiting position, the optical material 100, which has, for example, a spherical shape, is placed on the concave mold surface 32b of the lower mold 32 by a transportation robot (not shown). Then, as shown in FIG. 6A, the upper mold 31 is caused to descend by pressurization means (not shown) and is inserted into the sleeve 33 from above so as to abut the optical material 100. The difference between a thickness h51 of the high expansion ring 34 in the mold opening-closing direction at this moment (i.e., before the heating step) and the position difference h0 above (h51-h0) is smaller than a thickness h61 of the low expansion ring 35.

The optical material 100, placed between the upper mold 31 and the lower mold 32, is heated and softened via heat provided by heating means (not shown) such as a heater producing heat being conducted via the upper mold 31, the lower mold 32, the sleeve 33, and the like (the heating step).

As shown in FIG. 6B, after the pressurization step of pressurizing and transforming the optical material 100 via the upper mold 31, descending is started (thickness h52-h0), the difference between a thickness 51 of the high expansion ring 34 and the position difference h0 (h51-h0) becomes greater than a thickness h62 of the low expansion ring 35. The change is made in accordance with the heating of the optical material 100.

In addition, even when the linear expansion coefficients of the high expansion ring 34 and the low expansion ring 35 are identical with each other, the aforementioned change is made since the thickness of the high expansion ring 34 in the mold opening-closing direction at the first temperature T1 and the second temperature T2 (these temperatures will be described later) is greater than the thickness of the low expansion ring 35 in the mold opening-closing direction at the first temperature T1 and the second temperature T2. The thickness ratio may preferably be two or higher.

Figure 6C:
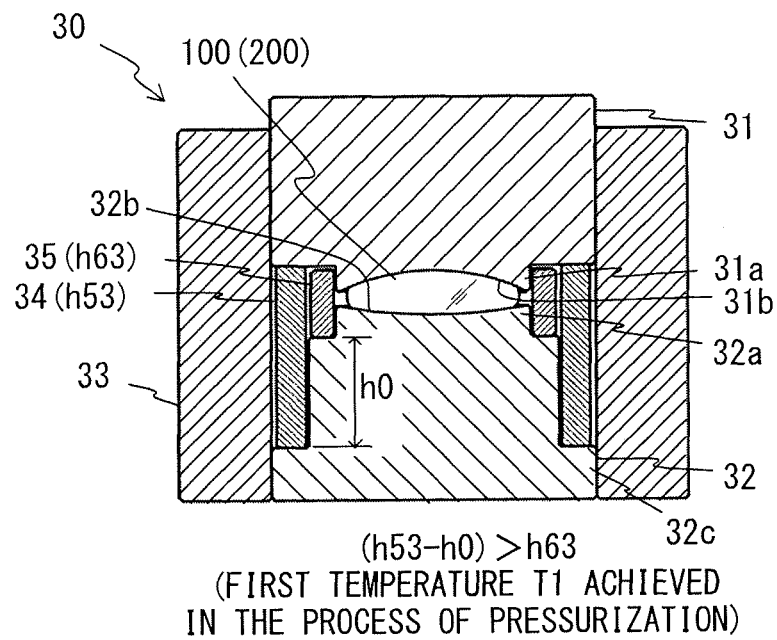
FIG. 6C is a cross sectional view showing the mold set according to the third embodiment of the present invention (Pattern 3).

As shown in FIG. 6C, during the pressurizing step (the first temperature T1), only the high expansion ring 34 (thickness h53) from among the high expansion ring 34 and the low expansion ring 35 (thickness h63) is in contact with the upper mold 31 so that it secures the interval between the upper mold 31 and the lower mold 32.

Next, the pressurized and transformed optical material 100 (i.e., the optical element 200 obtained via molding) is cooled down to, for example, a glass transition temperature or lower via, for example, the temperature of the heating means being lowered (the cooling step), with the result that the optical material 100 hardens and shrinks. As a result of the cooling of the optical material 100 (the optical element 200), the difference between a thickness h54 of the high expansion ring 34 and the position difference h0 (h54-h0) after the start of the cooling step becomes the same as a thickness h64 of the low expansion ring 34.

During the cooling step, the upper mold 31 is also pressurized downward by pressurization means (not shown). When the difference between the thickness of the high expansion ring 34 and the position difference h0 is greater than the thickness of the low expansion ring 35, the upper mold 31 descends in accordance with shrinking of the high expansion ring 34. At this moment, the optical material 100 (the optical element 200) whose shrinkage amount is smaller than the high expansion ring 34 while the first temperature T1 is changing into the second temperature T2 is pressurized as much as or more than the shrinkage amount.

The shrinkage amount of the high expansion ring 34 becomes larger than that of the low expansion ring 35 at the second temperature T2 achieved during the cooling step after the difference between the thickness of the high expansion ring 34 and the position difference h0 becomes the same as the thickness of the low expansion ring 35. Accordingly, the difference between a thickness h55 of the high expansion ring 34 and the position difference h0 becomes smaller than a thickness h65 of the low expansion ring 35.

Figure 6E:
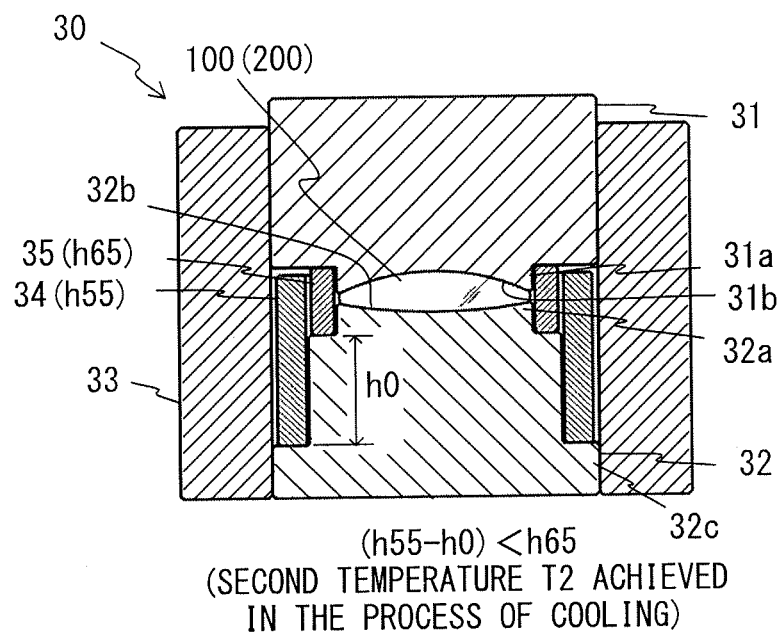
FIG. 6E is a cross sectional view showing the mold set according to the third embodiment of the present invention (Pattern 5).

The low expansion ring 35 has a lower linear expansion coefficient and a smaller shrinkage amount than the optical material 100 (the optical element 200), and hence the upper mold 31 is in contact with the low expansion ring 35 as shown in FIG. 6E. In this way, the low expansion ring 35 secures the interval between the upper mold 31 and the lower mold 32 at the second temperature T2 achieved during the cooling step. Because of the low expansion ring 35, the upper mold 31 does not follow the hardening and shrinking of the optical material 100 (the optical element 200) even when it is pulled by the optical material 100 (the optical element 200). Accordingly, a gap appears between the upper mold 31 and the optical material 100 (the optical element 200), and hence the optical material 100 (the optical element 200) is released from the upper mold 31.

In this way, the optical material 100 (the optical element 200) is released from the mold smoothly. After this, the upper mold 31 moves to the upper waiting position above, and a transportation robot (not shown) takes out the optical element on the concave mold surface 32b of the lower mold 32.

Figure 7:
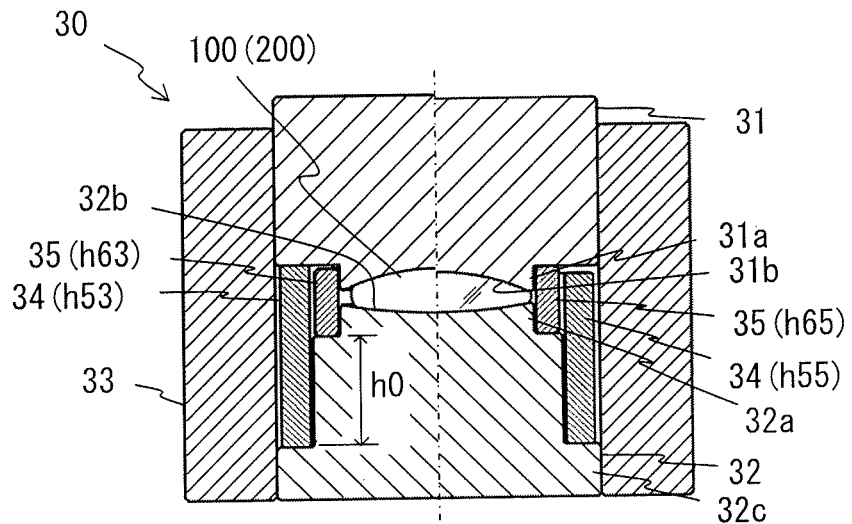
FIG. 7 is a cross sectional view comparing and illustrating states of the mold set according to the third embodiment of the present invention, one of the states being achieved while the mold set is being pressurized and the other of the states being achieved while the mold set is being cooled.

In the present embodiment described above, as shown in FIG. 6C (FIG. 7), the high expansion ring (the first spacer) 34 secures the interval between the upper mold (the first mold) 31 and the lower mold (the second mold) 32 at the first temperature T1 achieved while the optical material 10 is pressurized. The high expansion ring 34 shrinks in the mold opening-closing direction more greatly than the low expansion ring (the second spacer) 35 while the first temperature T1 is changing into the second temperature T2 achieved while the optical material 100 is cooled. As shown in FIG. 6E (FIG.

7), the low expansion ring 35 secures the interval between the upper mold 31 and the lower mold 32 at the second temperature T2.

Accordingly, without the position of the upper mold 31 being complexly controlled by pressurization means or the like, the high expansion ring 34 adjusts the pressurization position of the optical material 100 (the optical element 200) at which it is pressurized at the first temperature T1 achieved while the optical material 100 is pressurized. After this, the upper mold 31 descends in accordance with the shrinking of the high expansion ring 34. The low expansion ring 35 prevents the upper mold 31 from following the shrinking of the high expansion ring 34, thereby adjusting the mold release position of the optical material 100 (the optical element 200) at which it is released from the mold.

Accordingly, according to the present embodiment, the optical element 200 may be released smoothly from the mold by using a simple configuration. In addition, using a simple configuration, the thickness of the optical element 200 and the mold release timing may be adjusted.

In the present embodiment, the thickness of the high expansion ring 34 in the mold opening-closing direction at the first temperature T1 and the second temperature T2 is greater than the thickness of the low expansion ring 35 in the mold opening-closing direction at the first temperature T1 and the second temperature T2. Accordingly, without making the linear expansion coefficient of the high expansion ring 34 higher than that of the low expansion ring 35, the shrinkage amount of the high expansion ring 34 and that of the low expansion ring 35 may be adjusted. Accordingly, the degree of freedom in the design increases as can be seen from, for example, the fact that a far simpler configuration can be made by forming the high expansion ring 34 and the low expansion ring 35 from the same material.

Also in this case, the high expansion ring 34 and the low expansion ring 35 may be formed of different materials. When this is done, then, by making the high expansion ring 34 have a higher linear expansion coefficient than the low expansion ring 35, as in the case in the first embodiment, the shrinkage amount of the high expansion ring 34 may be far larger than that of the low expansion ring 35.

In the present embodiment, the thickness of the high expansion ring 34 in the mold opening-closing direction at the first temperature T1 and the second temperature T2 is at least two times greater than the thickness of the low expansion ring 35 in the mold opening-closing direction at the first temperature T1 and the second temperature T2. Accordingly, the adjustment of the shrinkage amount of the high expansion ring 34 and that of the low expansion ring 35 may be easily achieved.

What is claimed is:

1. A mold set comprising:
a first mold and a second mold placed so that they sandwich an optical material and face each other; and
a first spacer and a second spacer provided between the first and second molds, wherein:
the first spacer secures an interval between the first and second molds at a first temperature achieved in a process of pressurizing the optical material;
the first spacer shrinks in a mold opening-closing direction more greatly than the second spacer while the first temperature is changing to a second temperature achieved in a process of cooling the optical material; and
the second spacer secures the interval between the first and second molds at the second temperature.

2. The mold set according to claim 1, wherein:
a shrinkage amount of the first spacer in the mold opening-closing direction achieved while the first temperature is changing to the second temperature is larger than a shrinkage amount of the optical material in the mold opening-closing direction achieved while the first temperature is changing to the second temperature; and
a shrinkage amount of the second spacer in the mold opening-closing direction achieved while the first temperature is changing to the second temperature is smaller than the shrinkage amount of the optical material in the mold opening-closing direction achieved while the first temperature is changing to the second temperature.

3. The mold set according to claim 1, wherein
the first spacer has a higher linear expansion coefficient than the second spacer.

4. The mold set according to claim 1, wherein
a thickness of the first spacer in the mold opening-closing direction at the first and second temperatures is greater than a thickness of the second spacer in the mold opening-closing direction at the first and second temperatures.

5. The mold set according to claim 4, wherein
the thickness of the first spacer in the mold opening-closing direction at the first and second temperatures is at least two times greater than the thickness of the second spacer in the mold opening-closing direction at the first and second temperatures.

6. The mold set according to claim 1, further comprising
a sleeve placed at a circumference of the first and second molds and holding the first and second molds, wherein
the second spacer is provided integrally with the sleeve.

7. The mold set according to claim 1, wherein
the first spacer between the first and second molds is placed further outward than the second spacer.

8. A manufacturing method for manufacturing an optical element, the method comprising:
heating and softening an optical material between a first mold and a second mold which face each other;
pressurizing and transforming the optical material after the heating and softening; and
cooling the optical material after the pressurizing and transforming, wherein:
at a first temperature achieved during the pressurizing and transforming, a first spacer secures an interval between the first and second molds; and
at a second temperature achieved during the cooling, a second spacer secures the interval between the first and second molds, wherein a shrinkage amount of the second spacer in a mold opening-closing direction achieved while the first temperature is changing to the second temperature is smaller than a shrinkage amount of the first spacer in the mold opening-closing direction achieved while the first temperature is changing to the second temperature.

* * * * *